United States Patent [19]

Thompson

[11] Patent Number: 5,732,684
[45] Date of Patent: Mar. 31, 1998

[54] AUTOMOTIVE FUEL DELIVERY SYSTEM WITH PRESSURE ACTUATED AUXILIARY FUEL PUMP

[75] Inventor: Robert H. Thompson, Redford, Mich.

[73] Assignee: Ford Global Technologies, Inc., Dearborn, Mich.

[21] Appl. No.: 310,294

[22] Filed: Sep. 22, 1994

[51] Int. Cl.⁶ .................................................. F02M 37/04
[52] U.S. Cl. ........................... 123/514; 123/509; 417/395; 417/390
[58] Field of Search ............................. 123/514, 509, 123/516, 510; 137/571, 568, 566; 417/395, 375, 383, 390

[56] References Cited

U.S. PATENT DOCUMENTS

| | | |
|---|---|---|
| 2,619,036 | 11/1952 | Mann . |
| 2,953,156 | 9/1960 | Bryant ................................. 137/571 |
| 3,085,620 | 4/1963 | Johnson . |
| 3,215,080 | 11/1965 | Bernard . |
| 3,930,756 | 1/1976 | Bruggeman . |
| 4,523,901 | 6/1985 | Schippers ........................... 417/395 |
| 4,551,076 | 11/1985 | Dubois ............................... 417/395 |
| 4,834,132 | 5/1989 | Sasaki ................................ 123/514 |
| 5,040,515 | 8/1991 | Leiterman .......................... 417/395 |
| 5,078,169 | 1/1992 | Scheurenbrand ................... 137/571 |
| 5,133,324 | 7/1992 | Michiari ............................. 123/514 |
| 5,197,444 | 3/1993 | Lang ................................... 137/571 |
| 5,218,942 | 6/1993 | Coha et al. . |
| 5,246,351 | 9/1993 | Horn .................................. 417/395 |
| 5,289,810 | 3/1994 | Bauer ................................. 123/514 |

Primary Examiner—Carl S. Miller
Attorney, Agent, or Firm—David B. Kelley

[57] ABSTRACT

An automotive fuel delivery system for an internal combustion engine has a saddle type fuel tank with two lobes, a primary lobe and a secondary lobe, straddling vehicle components therebetween. A primary fuel pump is mounted in the primary lobe with a fuel delivery line extending therefrom for carrying pressurized fuel from the primary fuel pump to the engine, and a pressure actuated auxiliary fuel pump is mounted in the secondary lobe for pumping fuel therefrom to the primary lobe. The auxiliary fuel pump has a drive chamber for receiving pressurized fuel from the input line to urge a drive diaphragm to an extended position, and high hysteresis relief valve means for controllably releasing pressurized fuel from the drive chamber to the secondary lobe to allow the drive diaphragm to contract to a retracted position. A pumping chamber in the auxiliary pump has an auxiliary pumping diaphragm, mechanically connected to the drive diaphragm, with intake and output positions corresponding to the retracted and extended positions of the drive diaphragm, respectively. The pumping chamber also has an inlet in fluid communication with the fuel tank for allowing fuel flow from the fuel tank into the pumping chamber, and an outlet in fluid communication with the primary lobe for allowing fuel flow from the pumping chamber to the primary lobe.

2 Claims, 3 Drawing Sheets

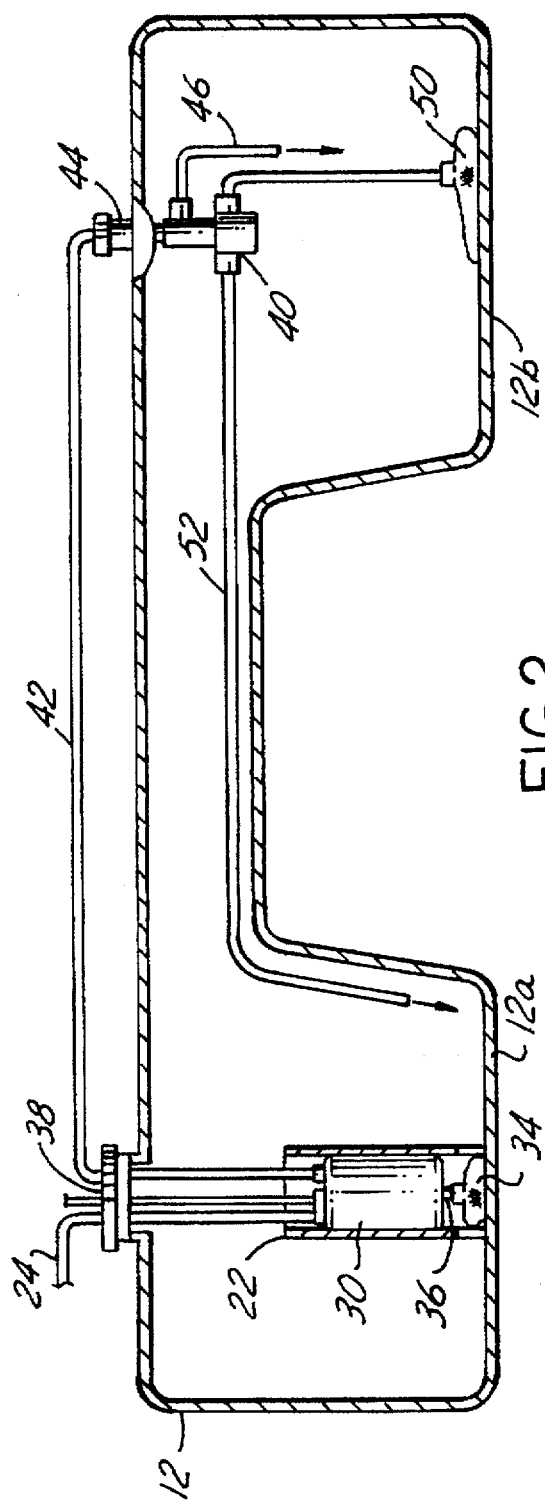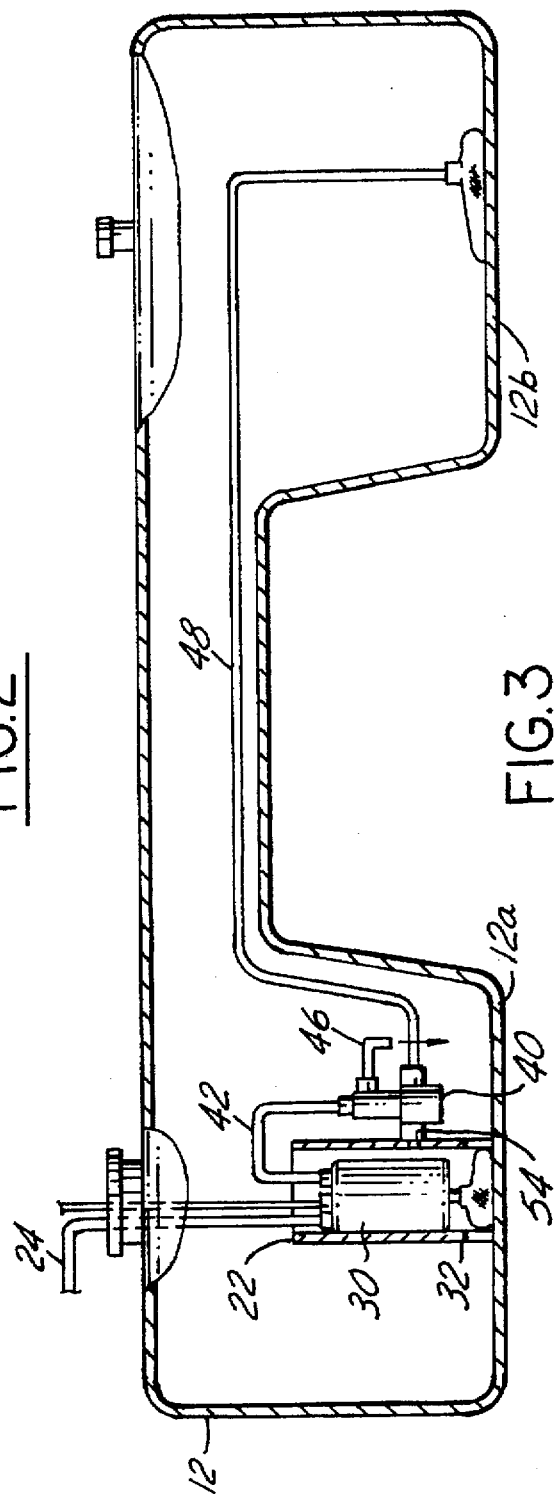

AUTOMOTIVE FUEL DELIVERY SYSTEM WITH PRESSURE ACTUATED AUXILIARY FUEL PUMP

FIELD OF THE INVENTION

The present invention relates to automotive fuel delivery systems for internal combustion engines and, more particularly, to an automotive fuel delivery system having a pressure actuated auxiliary pump for transferring fuel between separate volumes within a fuel tank or between separate fuel tanks within a vehicle.

BACKGROUND OF THE INVENTION

Automotive vehicle designers must often cope with limited package space for fuel delivery system components, particularly the fuel tank. As a result, the fuel tank may be irregularly shaped to clear nearby vehicle components, such as driveshafts, differentials, or exhaust systems. A common fuel tank design which achieves the foregoing purpose, referred to as a "saddle tank", has two lobes connected on top which straddle a vehicle component therebetween. One lobe of the fuel tank usually contains a primary fuel delivery pump. Due to the irregular shape of the saddle fuel tank, however, fuel in the lobe without the primary fuel pump will not flow naturally by gravity to the primary fuel pump inlet. Since two primary pumps are too expensive to be practical, it is necessary, therefore, to move fuel from one lobe of the tank to the lobe containing the primary fuel pump.

Traditionally, movement of fuel between separate volumes in a fuel tank has been accomplished through use of a jet pump, as in U.S. Pat. No. 5,218,942 (Coha et al.). A jet pump is essentially a venturi device that obtains its pumping capability by a pressure drop caused by flow across a constricted cross-section. This creates three disadvantages. First, the maximum gain of most jet pumps is only 8:1, that is, for every liter of fuel diverted through it, 8 liters of fuel are delivered from it. The low gain of jet pumps decrease overall system efficiency. Second, a jet pump may lose its prime by drawing air in extremely low fuel conditions, thus curtailing fuel transfer from the lobe without a primary pump. Third, a significant supply of pressurized flow must be diverted to power the jet pump (perhaps as much as 15-20%) thereby obviating the minimum pump flow advantage in returnless fuel delivery systems.

SUMMARY OF THE INVENTION

The present invention provides a new and improved automotive fuel delivery system for an internal combustion engine having a fuel tank with a plurality of separate volumes, or lobes, and a primary fuel pump mounted in a primary lobe with a fuel delivery line extending therefrom for carrying pressurized fuel from the primary fuel pump to the engine. An auxiliary fuel pump, mounted in one of the fuel tank lobes, has drive means actuated by pressurized fuel from the fuel delivery line, and pumping means mechanically connected to the drive means for pumping fuel from one of the lobes to the primary lobe.

The drive means comprises an input line in fluid communication with the fuel delivery line, a drive chamber for receiving pressurized fuel from the input line to urge a drive diaphragm in the drive chamber to an extended position, and relief valve means for controllably releasing pressurized fuel from the drive chamber to the secondary chamber to allow the drive diaphragm to contract to a retracted position. Preferably, the relief means comprises a poppet valve having an inlet orifice with a cross-sectional area significantly less than the cross-sectional area of the poppet so that the poppet valve exhibits high hysteresis characteristics.

The pumping means comprises a pumping chamber with an auxiliary pumping diaphragm, mechanically connected to the drive diaphragm, with intake and output positions corresponding to the retracted and extended positions of the drive diaphragm, respectively. The pumping chamber has an inlet in fluid communication with the fuel tank for allowing fuel flow from the fuel tank into the pumping chamber, and an outlet in fluid communication with the primary lobe for allowing fuel flow from the pumping chamber to the primary lobe.

An object of the present invention is to provide a fuel delivery system which moves fuel within separate volumes of a fuel tank, or among separate fuel tanks, without the aforementioned drawbacks of a jet pump.

Another object of the present invention is to provide a fuel delivery system utilizing a pressure actuated auxiliary fuel pump for transferring fuel from one lobe of a saddle type fuel tank to another lobe with a primary fuel delivery pump.

Yet another object of the present invention is to provide a fuel delivery system for efficiently delivering fuel from a saddle tank to an internal combustion engine.

An advantage of the fuel delivery system of the present invention is that system efficiency is not degraded by ingestion of fuel vapor.

Another advantage of the present invention is that the pressure actuated auxiliary pump has a can be sized to yield higher gains than a jet pump thereby providing more efficient intra-tank fuel transfer.

A feature of the present invention is a pressure actuated auxiliary pump having high hysteresis relief valving for efficient control of the auxiliary pump drive chamber.

BRIEF DESCRIPTION OF THE DRAWINGS

FIG. 2 is a cut-away view of a fuel tank showing a fuel delivery system according to a preferred embodiment of the present invention mounted therein.

FIG. 3 is a cut-away view similar to FIG. 2 but showing a fuel delivery system according to an alternative embodiment of the present invention mounted therein.

DETAILED DESCRIPTION OF THE PREFERRED EMBODIMENT

Figure 1:
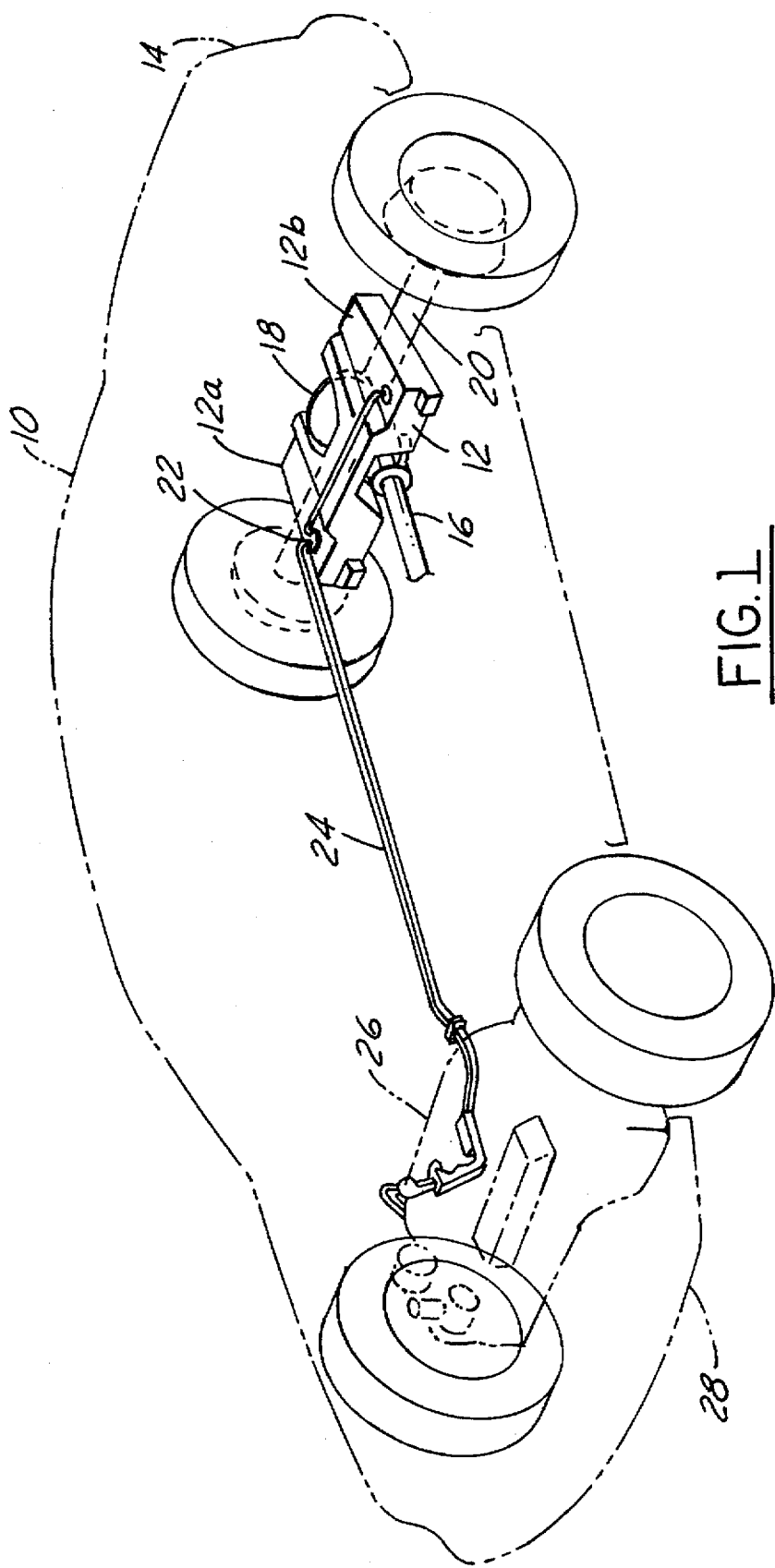
FIG. 1 is a perspective view of an automotive fuel system according to the present invention.

Referring now to FIG. 1, vehicle 10 has irregularly shaped fuel tank 12 mounted at vehicle rear section 14. In the embodiment of FIG. 1, fuel tank 12 is irregularly shaped to accommodate driveshaft 16, differential 18, and rear axle 20 of vehicle 10. Fuel tank 12 is conventionally referred to as a "saddle tank" since it has two volumes or lobes 12a and 12b straddling driveshaft 16 and differential 18. Lobes 12a and 12b are connected by volume 13 which extends therebetween. As will be understood by those skilled in the art, FIG. 1 is for illustrative purposes only and not meant to indicate vehicle or fuel tank dimensions, and is but one rendering of an irregularly shaped fuel tank 12 for which the fuel delivery system of the present invention can appropriately be used.

Fuel tank 12 has sender unit 22 mounted therein in conventional fashion known to those skilled in the art and suggested by this disclosure (FIG. 2). Extending from fuel sender 22 is fuel delivery line 24 which delivers pressurized fuel to internal combustion engine 26 situated at a forward section 28 of vehicle 10 (FIG. 1).

As seen in FIG. 2, fuel sending unit 22 has primary fuel pump 30 mounted within module 32 at a lower portion of lobe 12a of fuel tank 12. Primary pump 30 has primary fuel filter 34 connected at primary pump inlet 36. Fuel delivery line 24 extends from primary fuel pump 30 through flange 38 and extends to engine 26, as described above. As previously discussed, due to the irregular shape of tank 12, it is desirable to transfer fuel from lobe 12b to lobe 12a of fuel tank 12. Without a means for transferring fuel between the lobes, primary pump 30 would exhaust the fuel supply in lobe 12a and the fuel in lobe 12b would remain unused for lack of means to pump it to engine 26. Since two separate high pressure pumps is too expensive to be practical, as previously mentioned, an auxiliary fuel pump 40 is mounted within fuel tank 12 in lobe 12b according to a preferred embodiment of the present invention (FIG. 2). An input line 42 extends from fuel delivery line 24 exteriorly of fuel tank 12 to flange 44 whereupon it enters lobe 12b. Input line 42 carries a portion of pressurized fuel from primary fuel pump 30 to operate auxiliary fuel pump 40, as further described below. A pressure relief line 46 exhausts the fuel input to auxiliary pump 40 into lobe 12b. Auxiliary pump 40 also has inlet line 48 with auxiliary filter 50 attached thereto in a lower section of lobe 12b. Outlet line 52 carries pumped fuel from lobe 12b into lobe 12a where it is subsequently pumped by primary fuel pump 30 to engine 26 for combustion therein.

An alternative embodiment of the present invention, having auxiliary fuel pump 40 mounted to fuel sending unit 22 within lobe 12a, is shown in FIG. 3. In the alternative embodiment, auxiliary fuel pump 40 is mounted to module 32 and delivers fuel from lobe 12b through inlet line 48, which extends from lobe 12b through volume 13 and into auxiliary fuel pump 40, where it is pumped into module 32 through orifice 54. Pressurized fuel to actuate auxiliary fuel pump 40 is delivered from primary fuel pump 30 through input line 42 which is connected within tank 12 to auxiliary fuel pump 40. The fuel to drive pump 40 is then exhausted through relief line 46 to lobe 12a.

The inner workings of auxiliary fuel pump 40 will now be described with reference to FIG. 4. Drive chamber 56 is in fluid communication with input line 42 at an upper section of auxiliary fuel pump 40. On an opposite side of drive chamber 56 is mounted drive diaphragm 58, which, as discussed below, can move between extended position 58a and retracted position 58b. Also mounted in drive chamber 56 is drive diaphragm stop 60 for limiting movement of drive diaphragm 58 to retracted position 58b.

Figure 4:
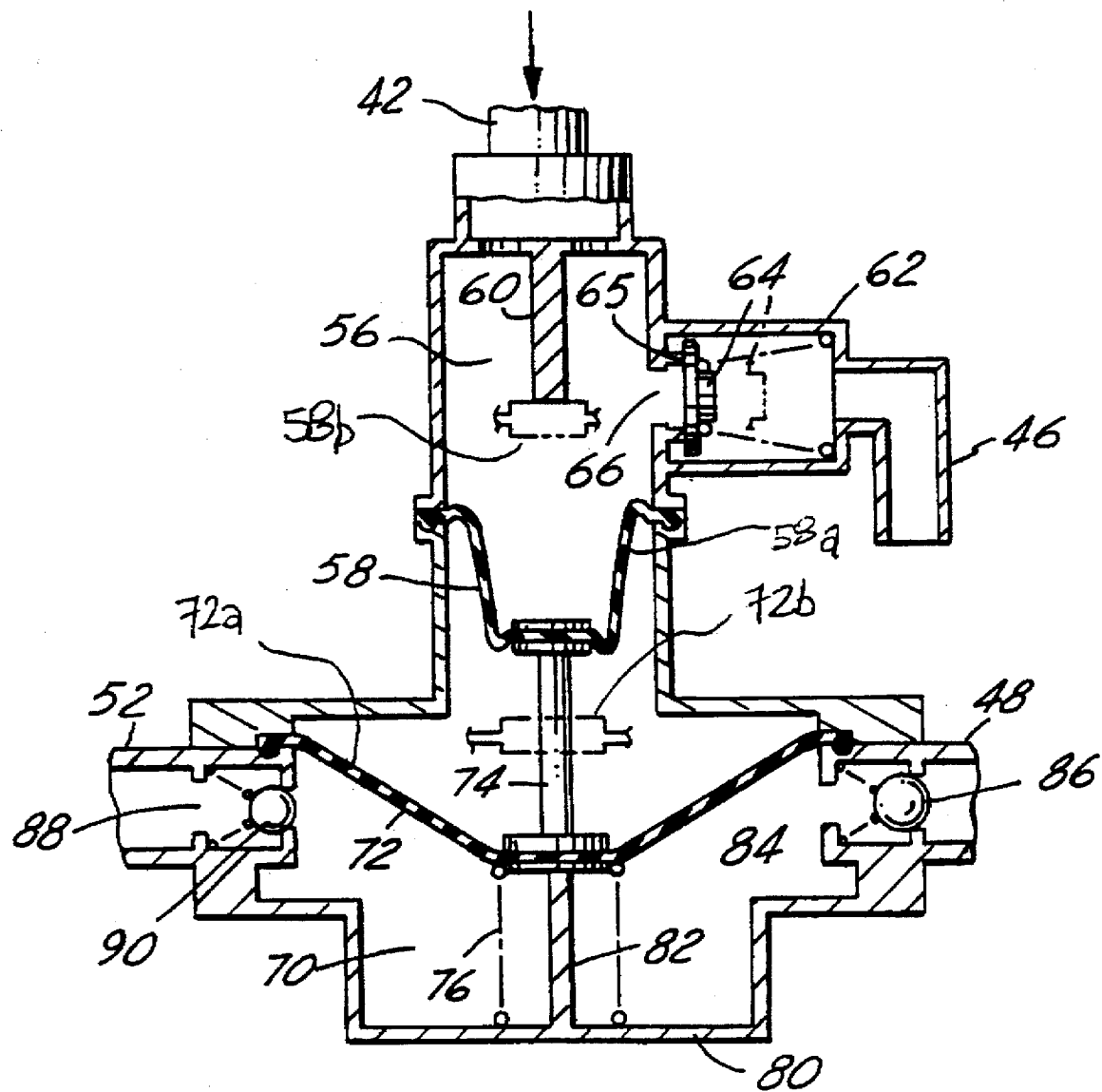
FIG. 4 is a schematic view of an auxiliary fuel pump according to a preferred embodiment of the present invention.

Connected in fluid communication with drive chamber 56 is relief valve 62 for controllably releasing pressurized fuel from drive chamber 56 to fuel tank 12, thus allowing contraction of drive diaphragm 58 contract to retracted position 58b (FIG. 4). Relief valve 62 preferably has high hysteresis characteristics for preventing high frequency cycling. To that end, poppet 64 is sized to have a significantly larger cross-sectional area than relief orifice 66, which connects drive chamber 56 and relief valve 62 in fluid communication. The ratio of poppet 64 cross-sectional area to orifice 66 cross-sectional area is on the order of 2:1, depending on the magnitude of spring 68 force. Thus, the drive chamber 56 pressure induced force on poppet 64 needed to overcome the opposing force of spring 68 is higher than the drive chamber 56 pressure needed to maintain poppet 64 in the open position once opened. Drive chamber 56 can therefore be nearly emptied of fuel before another pumping cycle begins.

Still referring to FIG. 4, auxiliary fuel pump 40 has pumping chamber 70 on a bottom section thereof. Pumping chamber 70 is sized so as to have a significantly larger volume than drive chamber 56, with a pumping chamber 70 volume to drive chamber 56 volume ratio, or gain, between approximately 5:1 and 30:1, and preferably approximately 20:1. Drive chamber 56 volume and pumping chamber 70 volume are sized according to application, and may depend on, for example, fuel tank capacity and primary fuel pump 30 pump rate. One side of pumping chamber 70 has auxiliary pumping diaphragm 72 which is mechanically connected to drive diaphragm 58 with rod 74 for translating motion therebetween. Auxiliary pumping diaphragm 72 has output position 72a and intake position 72b corresponding to extended position 58a and retracted position 58b of the drive diaphragm 56, respectively.

Coil spring 76 is mounted in pumping chamber 70 between wall 78 opposite pumping diaphragm 72 and pumping diaphragm 72 to bias pumping diaphragm 72 to the intake position 72b. Pumping diaphragm stop 80 extends from wall 80 into pumping chamber 70 to limit movement of pumping diaphragm 72 when in the outlet position 72b.

Pumping chamber 70 also has inlet 84 in fluid communication with fuel tank 12 through inlet line 48 for allowing fuel flow from fuel tank 12 into pumping chamber 70. Preferably, inlet 84 has inlet check valve 86 mounted therein which allows flow therethrough when pumping diaphragm 72 moves from output position 72a to intake position 72b, and which prevents flow therethrough when pumping diaphragm 72 moves from intake position 72b to said output position 72a. Fuel is pumped out of pumping chamber 70 through outlet 88 and to outlet line 52 which is in fluid communication with either lobe 12a or 12b in the preferred embodiment and alternative embodiment, respectively. Outlet 88 preferably has outlet check valve 90 mounted therein for allowing fuel flow from pumping chamber 70 to fuel tank 12 when the pumping diaphragm 72 moves from intake position 72b to output position 72a and preventing fuel flow through outlet 88 when pumping diaphragm 72 moves from output position 72a to intake position 72b.

In operation, fuel tank 12 is filled with fuel and primary fuel pump 30 pumps fuel from lobe 12a through fuel delivery line 24 to engine 26 (FIGS. 1 and 2). A portion of high pressure fuel is routed from fuel delivery line 24 through input line 42 to auxiliary fuel pump 40. This high pressure fuel enters drive chamber 56 whereupon pressure begins to build therein. As pressure builds, drive diaphragm 58 extends to extended position 58a thereby forcing pumping diaphragm 72 to outlet position 72a, through rod 74. As diaphragm 72 is moved to outlet position 72a, fuel in pumping chamber 70 is expelled through outlet check valve 90 and outlet 88 (FIG. 4). The expelled fuel flows through outlet line 52 and into lobe 12a in the preferred embodiment of FIG. 2. In the alternative embodiment of FIG. 3, the expelled fuel flows through orifice 54 to module 32.

When sufficient pressure builds within drive chamber 56 so that the resulting force on poppet 64 through relief orifice 66 is greater than the opposing force of spring 68, poppet 64 lifts from seat 65 thus allowing fuel within drive chamber 56 to flow through relief valve 62, to relief line 46, and into fuel tank 12. As the fuel empties, pressure in drive chamber 56 decreases allowing coil spring 76 to urge pumping diaphragm 72 from outlet position 72a to inlet position 72b. During this intake stroke, inlet check valve 86 opens to allow fuel to flow from lobe 12b through inlet line 48 into pumping chamber 70.

When pressure within drive chamber 56 decreases sufficiently, spring 68 of relief valve 62 returns poppet 64 to seat 65. Fuel from input line 42 begins to collect in drive chamber 56 and the cycle begins again.

Although the preferred embodiments of the present invention have been disclosed, various changes and modifications may be made without departing from the scope of the invention as set forth in the appended claims.

I claim:

1. An automotive fuel delivery system for an internal combustion engine, the system comprising:

a saddle fuel tank having a primary lobe and a secondary lobe;

a primary fuel pump mounted in the primary lobe;

a fuel delivery line for carrying pressurized fuel from the primary fuel pump to the engine for combustion therein; and an auxiliary fuel pump mounted in the fuel tank for pumping fuel therefrom to the primary volume, the auxiliary fuel pump having:

(a) an input line in fluid communication with the fuel delivery line;

(b) a drive chamber for receiving pressurized fuel from the input line to urge a drive diaphragm in the drive chamber to an extended position;

(c) relief valve means having high hysteresis characteristics for controllably releasing pressurized fuel from the drive chamber to the fuel tank to allow the drive diaphragm to contract to a retracted position, the relief valve means comprising a poppet valve having:

a poppet movable between an open and a closed position;

a poppet spring for biasing the poppet to the closed position; and an inlet orifice with a cross-sectional area significantly less than the cross-sectional area of the poppet so that the drive chamber pressure induced force on the poppet needed to overcome the opposing force of the spring is higher than the drive chamber pressure needed to maintain the poppet in the open position once opened;

(d) a pumping cheer having an auxiliary pumping diaphragm mechanically connected by a rod to the drive diaphragm with intake and output positions corresponding to the retracted and extended positions of the drive diaphragm, respectively, the pumping chamber also having a volume significantly greater than the volume of the drive chamber;

(e) an inlet in the pumping chamber in fluid communication with the fuel tank for allowing fuel flow from the fuel tank into the pumping chamber; and (f) an outlet in the pumping chamber in fluid communication with the primary volume for allowing fuel flow from the pumping chamber to the primary volume, (g) bias means mounted within the pumping chamber for biasing the pumping diaphragm to the intake position.

2. A fuel delivery system according to claim 1 wherein the bias means comprises a coil spring mounted therein between a wall opposite the pumping diaphragm and the pumping diaphragm to bias the pumping diaphragm to the intake position.

* * * * *